United States Patent [19]
Kuroshima et al.

[11] 4,303,564
[45] Dec. 1, 1981

[54] PROCESS FOR STABILIZING VINYLIDENE CHLORIDE RESINS

[75] Inventors: Nobuaki Kuroshima, Nobeoka; Koichi Mashiki, Hyugo, both of Japan

[73] Assignee: Asahi-Dow Limited, Tokyo, Japan

[21] Appl. No.: 125,410

[22] Filed: Feb. 28, 1980

[30] Foreign Application Priority Data

Mar. 27, 1979 [JP] Japan .................................. 54-35079

[51] Int. Cl.$^3$ ........................ C08K 3/32; C08K 5/11; C08K 5/15
[52] U.S. Cl. ........................ 260/23 XA; 260/45.7 P; 260/45.8 A; 260/45.85 S; 260/45.85 T; 526/343
[58] Field of Search ............... 260/45.7 P, 45.8 A, 260/45.85 S, 45.85 T, 23 XA; 526/343

[56] References Cited

U.S. PATENT DOCUMENTS

| 2,429,165 | 10/1947 | Matheson et al. | 260/45.85 T |
| 2,477,610 | 8/1949 | Irons et al. | 260/45.85 T |
| 2,477,612 | 8/1949 | Irons | 260/45.85 T |
| 2,477,613 | 8/1949 | Irons | 260/45.85 T |
| 2,680,106 | 6/1954 | Havens | 260/45.7 P |
| 2,861,976 | 11/1958 | Gordon | 260/45.7 P |
| 3,658,778 | 4/1972 | Toyoda et al. | 260/23 XA |
| 3,896,063 | 7/1975 | Toyoda et al. | 260/23 XA |

FOREIGN PATENT DOCUMENTS 55-34166 9/1980 Japan.

Primary Examiner—John Kight, III
Assistant Examiner—R. A. White
Attorney, Agent, or Firm—D. R. Howard

[57] ABSTRACT

A process for imparting heat and light stability to vinylidene chloride copolymer resins by adding thereto small amounts of Vitamin E, an alkyl ester of thiodipropionic acid having 12 to 18 carbon atoms in an alkyl group thereof and an alkali metal salt or an alkali earth metal salt of a phosphoric acid.

10 Claims, No Drawings

PROCESS FOR STABILIZING VINYLIDENE CHLORIDE RESINS

BACKGROUND OF THE INVENTION

The present invention relates to a process for producing a polyvinylidene chloride resin having excellent heat and light resistance. More particularly, the present invention relates to a process for improving the thermal stability and the light stability of a vinylidene chloride resin by adding thereto small amounts of Vitamin E, an alkyl ester of thiodipropionic acid and an alkali metal salt or an alkali earth metal salt of a phosphoric acid.

In general, vinylidene chloride resins comprise a vinylidene chloride copolymer to which suitable quantities of plasticizer and stabilizers are added to produce desired properties such as excellent oxygen barrier, moisture resistance, transparency, flexibility, oil resistance and heat shrinkability. With such properties, vinylidene chloride resins are very desirable as packaging materials for various foods and, recently have come to be used in an increasingly wider range of applications. The major shortcomings of vinylidene chloride resins are that they show a low thermal stability during melt processing and that products molded therefrom have poor heat and light stability.

To improve the thermal stability of vinylidene chloride resins during melt processing, heat stabilizers such as phenols, amines, sulfur or phosphorus compounds have been added. To improve the light stability of molded vinylidene chloride resinous products, light stabilizers such as salol (phenyl salicylate), benzophenone or benzotrizole have been added to the vinylidene chloride resin. However, these stabilizers have shortcomings in terms of amounts required, cost, color, and smell of resultant products, food sanitation and safety. Further, no single stabilizer has been able to meet both the thermal stability and the light stability requirements.

Desiring to improve the thermal stability of vinylidene chloride resins and the light stability of the resultant products molded therefrom, the Applicants undertook a series of intensive studies which took into account the aforementioned drawbacks of prior art stabilizers. In so doing, the Applicants found a novel process which comprises adding to a vinylidene chloride resin, small quantities of stabilizers, according to the present invention, thereby yielding a vinylidene chloride resin substantially free of discoloration, even after exposure to a thermal history of an ordinary melt processing, which in turn results in moldings having good external color and substantial resistance to discoloration either with time or with exposure to light.

SUMMARY OF THE INVENTION

Accordingly, an object of the present invention is to provide a process for stabilizing vinylidene chloride resins. These benefits and other advantages in accordance with the present invention are achieved by a process which comprises adding to 100 parts by weight of a vinylidene chloride copolymer which is obtained by a well-known process from about 0.0005 to about 0.1 parts by weight of Vitamin E, from about 0.0005 to about 0.2 parts by weight of an alkyl ester of thiodipropionic acid having from about 12 to about 18 carbon atoms in an alkyl group thereof, and from about 0.0005 to about 0.2 parts by weight of a phosphate selected from the group consisting of an alkali metal salt or an alkali earth metal salt of a phosphoric acid.

DETAILED DESCRIPTION OF THE INVENTION

The vinylidene chloride copolymers herein referred to include copolymers composed of vinylidene chloride as a main component thereof and unsaturated monomers copolymerizable therewith, said copolymers containing from about 60 to about 95 percent by weight of vinylidene chloride. Such copolymers can usually be obtained by copolymerizing from about 50 to about 98 parts of vinylidene chloride with from about 50 to about 2 parts of a copolymerizable unsaturated monomer. Copolymerizable monomers, suitable for the practice of the present invention include, but are not limited to, vinyl chloride, acrylates such as methyl acrylate and butyl acrylate, methacrylates such as methyl methacrylate and butyl methacrylate, acrylonitrile, isobutylene, vinyl acetate, and so forth. These copolymerizable monomers may be used singly or in combination.

Vitamin E useable according to the present invention includes alpha-, beta-, gamma- and delta-tocopherol and mixtures thereof. As the alkyl ester of thiodipropionic acid, it is preferable to use dilauryl thiodipropionate or distearyl thiodipropionate. The phosphates according to the present invention include alkali metal salts and alkali earth metals salts of the following phosphoric acids: orthophosphoric acid; metaphosphoric acid; peroxophosphoric acids such as peroxomonophosphoric acid and peroxodiphosphoric acid; polyphosphoric acids such as pyrophosphoric acid, triphosphoric acid and tetraphosphoric acid; and polymetaphosphoric acids such as trimetaphosphoric acid and tetrametaphosphoric acid. Illustrative alkali metal salts and alkali earth metal salts of these phosphoric acids include sodium pyrophosphate and sodium tripolyphosphate. Sodium pyrophosphate and sodium tripolyphosphate are most effective for obtaining a high stabilizing effect.

According to the present invention, each of the aforementioned stabilizers are advantageously added in an amount of from about 0.0005 to about 0.2 parts by weight and, preferably, from about 0.001 to about 0.05 parts by weight per 100 parts by weight of the vinylidene chloride copolymer. Further, the present invention is characterized by a combined use of the aforementioned three types of stabilizers. For any of these stabilizers, a content lower than 0.0005 parts by weight per 100 parts by weight of the vinylidene chloride copolymer is insufficient for achieving the object of the present invention. Addition of amounts exceeding 0.2 parts by weight per 100 parts by weight of the vinylidene chloride copolymer causes the stabilizing effect to be substantially saturated. Such excessive amounts are not only disadvantageous economically, but also lower the transparency of the resultant moldings.

According to the present invention, the stabilizers may be added to the monomers before they are copolymerized into a vinylidene chloride copolymer (hereinafter, this method shall be referred to as an advance addition), or the stabilizers may be added to a vinylidene chloride copolymer dispersion (hereinafter, this method shall be referred to as a slurry addition). With slurry addition, other additives ordinarily used for vinylidene chloride resins may be added, as required, together with the stabilizers according to the present invention. Alternatively, the stabilizers may be added to a vinylidene chloride copolymer during drying or following drying (hereinafter, this method shall be referred to as a dry addition). With dry addition, as with slurry addition, the aforesaid other additives may be added together with the stabilizers according to the present invention. Further, the aforementioned three methods, advance addition, slurry addition and dry addition, may be applied in combination. However, the advance addition method is most preferable for the present invention because the stabilizers, according to the present invention, act to prevent heat deterioration of prepolymers during polymerization and because the stabilizers are evenly dispersed in and throughout the resultant polymerization product.

While the mechanism which leads to improved heat and light stability of vinylidene chloride resins is not clearly understood, it is supposed that the aforementioned three types of stabilizers according to the present invention as used in combination might produce a synergistic effect.

Hereinafter, the present invention will be described further in detail by way of examples and references, in which all parts and percentages are given in terms of weight.

to completion of crystallization, the tubular parisons were vortically wound up, without being oriented, around a thin bar so as to form discoidal shapes 2 centimeters thick by 8 centimeters in diameter. The heat resistance of the resin compositions during the molding process was evaluated by visually observing heat discoloration of the respective resin discs. The light resistance of the vinylidene chloride-vinyl chloride resins was evaluated by using crystallized parisons set on a standard fadeometer (Model FA-SH-C, manufactured by Toyo Rikagaku Kogyo Co., Ltd.) in accordance with JIS L-0842-71 in which the irradiation time was set to 120 hours for all vinylidene chloride-vinyl chloride resin samples. Under the testing method of JIS L-0842-71, resin specimens, a black panel and a white panel revolve around a carbon arc lamp and are exposed to the ultraviolet radiation generated by the carbon arc lamp for a period of 120 hours so that the temperature of the black panel may be kept at 63° C. plus or minus 5° C. and so that the temperature of the white panel may be kept at about 40° C. Discoloration of the specimens is graded by comparison with a standard sample.

The results of the evaluation of the resins of Example 1 and References 1 through 7 are also given in Table 1 below.

TABLE 1

| Composition | Stabilizers | Contents* | Heat Discoloration | Light Resistance |
|---|---|---|---|---|
| Example 1 | Racemic-alpha-tocopherol | 0.01 | Not discolored | Grade 6.5 |
|  | Sodium pyrophosphate | 0.01 | (colorless) |  |
|  | Dilauryl thiodipropionate | 0.02 |  |  |
| Reference 1 | None | 0.00 | Colored in Light-Brown | Grade 3 |
| Reference 2 | Racemic-alpha-tocopherol | 0.04 | Colored in Light-Brown | Grade 4 |
| Reference 3 | Sodium pyrophosphate | 0.04 | Colored in Light-Yellow | Grade 5 |
| Reference 4 | Dilauryl thiodipropionate | 0.04 | Colored in Light-Yellow | Grade 3 |
| Reference 5 | Racemic-alpha-tocopherol | 0.02 | Colored in Light-Brown | Grade 5 |
|  | Sodium pyrophosphate | 0.02 |  |  |
| Reference 6 | Sodium pyrophosphate | 0.02 | Slightly Yellowed | Grade 4 |
|  | Dilauryl thiodipropionate | 0.02 |  |  |
| Reference 7 | Dilauryl thiodipropionate | 0.02 | Colored in Light-Brown | Grade 3.5 |
|  | Racemic-alpha-tocopherol | 0.02 |  |  |

*Contents of stabilizers added per 100 parts of the vinylidene chloride-vinyl chloride copolymer.

Example 1—(References 1 through 7)

By an advance addition method, varied quantities of racemic-alpha-tocopherol, dilauryl thiodipropionate and sodium pyrophosphate were added as stabilizers into a mixture consisting of 80 parts of vinylidene chloride monomer and 20 parts of vinyl chloride monomer. The resultant mixtures were then subjected to suspension polymerization. Any of the suspension polymerization processes known in the art will work. The resultant vinylidene chloride-vinyl chloride copolymers polymerized to a conversion of 85 percent and reduced viscosity (specific viscosity/concentration) of about 0.45, as measured in terms of their 2 grams/liter tetrahydrofuran solution at 30° Centigrade (hereinafter "C"). Following polymer recovery, 5 parts by weight of acetyl tributyl citrate and 2 parts by weight of epoxidized linseed oil were added per 100 parts of the recovered vinylidene chloride-vinyl chloride copolymers to obtain copolymer resin compositions having the stabilizer contents as given in Table 1 below.

The resultant copolymer resin compositions were then extruded into tubular parisons using a one and one-half inch melt extruder with a length to diameter ratio of 14 having a die temperature set at 190° C. Prior It is clear, based upon the results shown in Table 1, that the vinylidene chloride-vinyl chloride copolymer resin composition obtained by the process according to the present invention, shows a significantly higher heat stability during molding than the comparative samples, as well as an excellent post-molding light resistance rating (the larger the number the better the rating).

Example 2—(References 8 through 11)

Vinylidene chloride-vinyl chloride copolymers containing about 90 weight percent vinylidene chloride and about 10 weight percent vinyl chloride were prepared by suspension polymerization of a monomer mixture comprising about 82 parts of vinylidene chloride and 18 parts of vinyl chloride. The resultant polymer had a conversion of about 90 percent and reduced viscosity (specific viscosity/concentration) of about 0.54, as measured in terms of their 2 grams/liter tetrahydrofuran solution at 30° C. To each of the samples, 4 parts by weight of dibutyl sebacate, 2 parts by weight of dioxtyl adipate, and 2 parts by weight of epoxidized linseed oil were added per 100 parts of the copolymer.

Further, varied quantities, as shown in Table 2, of natural tocopherol (a mixture of alpha-, beta-, delta-, and gamma-tocopherol), distearyl thiodipropionate and sodium pyrophosphate were added as stabilizers by the dry addition method to obtain varied vinylidene chloride-vinyl chloride compositions.

In the same manner as in Example 1, the resultant respectively vinylidene chloride-vinyl chloride resin compositions were subjected to a heat resistance rest by way of heat discoloration and a light resistance test by means of a fadeometer. The results of the evaluation of the resins of Example 2 and References 8 through 11 are also shown in Table 2 below.

TABLE 2

| Composition | Stabilizers | Contents* | Heat Discoloration | Light Resistance |
|---|---|---|---|---|
| Example 2 | Natural tocopherol | 0.005 | Not Discolored (Colorless) | Grade 6 |
| | Sodium pyrophosphate | 0.010 | | |
| | Distearyl thiodipropionate | 0.015 | | |
| Reference 8 | None | 0.000 | Colored in Light-Brown | Grade 3 |
| Reference 9 | Natural tocopherol | 0.020 | Colored in Light-Brown | Grade 4 |
| | Sodium pyrophosphate | 0.010 | | |
| Reference 10 | Sodium pyrophosphate | 0.020 | Colored in Light-Yellow | Grade 4 |
| | Distearyl thiodipropionate | 0.010 | | |
| Reference 11 | Distearyl thiodipropionate | 0.020 | Colored in Light-Brown | Grade 3.5 |
| | Natural tocopherol | 0.010 | | |

*Contents of stabilizers added per 100 parts of the vinylidene chloride-vinyl chloride copolymer.

As clearly understood from the results shown in Table 2, the vinylidene chloride-vinyl chloride resin composition obtained by the process according to the present invention, is far superior to the resin compositions obtained by the processes of References 8 through 11 in terms of heat stability and post-molding light resistance.

Examples 3 through 7

In the same manner as in Example 1, vinylidene chloride-vinyl chloride resin compositions were prepared by the advance addition method with varied levels of additives, as noted in Table 3, in accordance with the present invention.

The resultant resin compositions were then subjected to a heat resistance test by way of heat discoloration and a light resistance test by means of a fadeometer as in Example 1. In addition, a parison transparency check was conducted before the parisons were vortically wound up as in Example 1. The results of the tests are also shown in Table 3.

TABLE 3

| Composition | Racemic-α-tocopherol | Sodium Phosphate* | Dilauryl Thiodipropionate* | Heat Discoloration | Light Resistance | Transparency |
|---|---|---|---|---|---|---|
| Reference 12 | 0.0003 | 0.0003 | 0.0003 | Colored in Light-Brown | Grade 3 | Transparent |
| Example 3 | 0.001 | 0.001 | 0.001 | Not Discolored (Colorless) | Grade 5.5 | Transparent |
| Example 4 | 0.010 | 0.010 | 0.010 | Not Discolored | Grade 6 | Transparent |
| Example 5 | 0.050 | 0.050 | 0.050 | Colored in Light-Yellow | Grade 6.5 | Transparent |
| Reference 13 | 0.250 | 0.250 | 0.250 | Colored in Light-Brown | Grade 6.5 | Opaque |

*Contents of stabilizers added per 100 parts of the vinylidene chloride-vinyl chloride copolymer.

As clearly understood from the test results shown in Table 3, the physical properties, particularly light resistance, of the vinylidene chloride-vinyl chloride resin composition are improved as the contents of the stabilizers, according to the present invention, increase. However, if the additive contents exceed the upper limit of the range of stabilizer content, according to the present invention, the light resistance of the vinylidene chloride-vinyl chloride resin containing the stabilizers will not continue to improve, but will, in fact, be reduced as will the heat resistance and transparency of the parisons.

In a manner similar to the foregoing beta-, gamma-, or delta-tocopherols are used as the Vitamin E component with similar results.

What is claimed is:

1. A process for stabilizing a vinylidene chloride containing resin which comprises adding to 100 parts by weight of a vinylidene chloride copolymer from about 0.0005 to about 0.2 parts by weight per 100 parts by weight of the vinylidene chloride copolymer of Vitamin E, from about 0.0005 to about 0.2 parts by weight per 100 parts by weight of the vinylidene chloride copolymer of an alkyl ester of thiodipropionic acid having 12 to 18 carbon atoms in the alkyl groups thereof, and from about 0.0005 to about 0.2 parts by weight per 100 parts by weight of the vinylidene chloride copolymer of a phosphate selected from the group consisting of an alkali metal salt or an alkali earth metal salt of a phosphoric acid.

2. The process according to claim 1 wherein the vinylidene chloride copolymer has polymerized therein from about 60 to about 95 percent by weight of vinylidene chloride and from about 40 to about 5 percent by weight of a compolymerizable unsaturated monomer.

3. The process according to claim 2 wherein the copolymerizable unsaturated monomer is vinyl chloride.

4. The process according to claim 1 wherein the Vitamin E is selected from the group consisting of alpha-, beta-, gamma- and delta-tocopherols and mixtures thereof.

5. The process according to claim 1 wherein the Vitamin E is racemic-alpha-tocopherol.

6. The process according to claim 1 wherein the alkyl ester of thiodipropionic acid is either dilauryl thiodipropionate or distearyl thiodipropionate.

7. The process according to claim 1 wherein the alkali metal salt or alkali earth metal salt of a phosphoric acid is selected from the group consisting of sodium pyrophosphate and sodium tripolyphosphate.

8. A process for stabilizing a vinylidene chloride containing resin which comprises adding to 100 parts by weight of a vinylidene chloride copolymer from about 0.001 to about 0.05 parts by weight per 100 parts by weight of the vinylidene chloride copolymer of Vitamin E, from about 0.001 to about 0.05 parts by weight per 100 parts by weight of the vinylidene chloride copolymer of an alkyl ester of thiodipropionic acid having 12 to 18 carbon atoms in the alkyl groups thereof, and from about 0.001 to about 0.05 parts by weight per 100 parts by weight of the vinylidene chloride copolymer of a phosphate selected from the group consisting of alkali metal salts and alkali earth metal salts of phosphoric acids.

9. A process for stabilizing a resin containing from about 60 to about 95 percent by weight of vinylidene chloride and from about 40 to about 5 percent by weight of vinyl chloride which comprises adding to 100 parts by weight of said resin from about 0.001 to about 0.05 parts by weight per 100 parts by weight of the resin of racemic-alpha-tocopherol, from about 0.001 to about 0.05 parts by weight per 100 parts by weight of the resin of dilauryl thiodipropionate and from about 0.001 to about 0.05 parts by weight per 100 parts by weight of the resin of sodium pyrophosphate.

10. The process according to claim 1 including a fourth stabilizer selected from the group consisting of acetyl tributyl citrate and epoxidized linseed oil.

* * * * *